(12) United States Patent
Owegeser

(10) Patent No.: US 12,521,912 B2
(45) Date of Patent: Jan. 13, 2026

(54) RECYCLING DEVICE AND METHOD FOR OPERATING A RECYCLING DEVICE

(71) Applicant: SMG Sportplatzmaschinenbau GmbH, Voehringen (DE)

(72) Inventor: Johann Baptist Owegeser, Illerrieden (DE)

(73) Assignee: SMG Sportplatzmaschinenbau GmbH, Voehringen (DE)

( * ) Notice: Subject to any disclaimer, the term of this patent is extended or adjusted under 35 U.S.C. 154(b) by 1041 days.

(21) Appl. No.: 17/337,677

(22) Filed: Jun. 3, 2021

(65) Prior Publication Data

US 2022/0009129 A1    Jan. 13, 2022

(30) Foreign Application Priority Data

Jun. 4, 2020    (DE) .................... 10 2020 114 923.9

(51) Int. Cl.
| | |
|---|---|
| *B29B 17/02* | (2006.01) |
| *B03B 4/02* | (2006.01) |
| *B08B 1/20* | (2024.01) |
| *B08B 7/02* | (2006.01) |

(Continued)

(52) U.S. Cl.
CPC ............... *B29B 17/02* (2013.01); *B03B 4/02* (2013.01); *B08B 1/20* (2024.01); *B08B 7/02* (2013.01); *B08B 7/04* (2013.01); *E01C 13/08* (2013.01); *B29B 2017/0286* (2013.01)

(58) Field of Classification Search
None
See application file for complete search history.

(56) References Cited

U.S. PATENT DOCUMENTS 9,278,380 B2 *   3/2016  Kunnas .................... B08B 3/02
11,517,945 B2 * 12/2022  Haughton ................ B08B 7/02
(Continued)

FOREIGN PATENT DOCUMENTS

| CN | 101835942 | 9/2010 |
| CN | 101835944 | 9/2010 |
| CN | 101899807 | 12/2010 |

(Continued)

OTHER PUBLICATIONS

KR 10-1168686 (Kolon Glotech Inc.) Jul. 30, 2012 (English language machine translation). [online] [retrieved Jul. 8, 2024]. Retrieved from: espacenet. (Year: 2012).*

*Primary Examiner* — Jonathan Snelting
(74) *Attorney, Agent, or Firm* — Loginov & Associates, PLLC; William A. Loginov

(57) ABSTRACT

Proposed according to the invention is a recycling device for removing filler material from a strip-shaped tape material having an upper side comprising projecting elements, and a lower side without projecting elements, in particular from artificial turf, having an unwinding means which is disposed at the entry side and is configured for unwinding a roll of the tape material; a transport system for conveying the tape material along a transport path from an entry side to an exit side, which comprises at least one transport means; and an emptying means for the tape material, said emptying means being disposed so as to face the lower side, and the transport path in said emptying means being redirected such that the filler material can drop out of the tape material.

13 Claims, 4 Drawing Sheets

(51) Int. Cl.
*B08B 7/04* (2006.01)
*E01C 13/08* (2006.01)

(56) References Cited

U.S. PATENT DOCUMENTS

2012/0006930 A1 1/2012 Mitchell
2021/0069759 A1* 3/2021 Haughton ................ B08B 1/10

FOREIGN PATENT DOCUMENTS

| CN | 102387843 | | 3/2012 | |
|----|-----------|---|--------|---|
| CN | 102803614 | | 11/2012 | |
| EP | 2387875 | A1 | 11/2011 | |
| EP | 2792227 | B1 | 8/2018 | |
| GB | 8900522D0 | | 3/1989 | |
| JP | 2000008314 | | 1/2000 | |
| KR | 10-1168686 | * | 7/2012 | ............. B07B 13/11 |

* cited by examiner

RECYCLING DEVICE AND METHOD FOR OPERATING A RECYCLING DEVICE

FIELD OF THE INVENTION

The invention relates to a recycling device and to a method for operating a recycling device.

BACKGROUND OF THE INVENTION

Such a recycling device is known from EP2792227 B1, for example. The mobile device in the latter serves for removing filler material from a strip-shaped tape material, in particular from artificial turf. Corresponding devices are thus known from the prior art and are in particular used for the preventative maintenance of artificial turf pitches, the installation of the latter or the removal of the latter. Artificial turf surfaces are also removed here and rolled up for recycling or reuse. A filler material such as, for example, sand, synthetic granules, rubber granules and/or cork granules, is interspersed in artificial turf surfaces in order for the latter to be used. The artificial turf is thus loaded. The filler material is removed from the tape material so as to now enable recycling, said filler material potentially being stored in so-called big bags for future use.

The recycling device of EP2792227 B1 is designed as a self-driving apparatus having a running gear which can be automatically controlled by way of a sensor. In order for a tape material to be picked up, the recycling device moves below the tape material, which is optionally just cut into webs, and picks up the latter from the ground. The recycling thus takes place in situ, or at the place where the tape material is installed, respectively. While this possibility does also offer advantages, recycling of this type can be expensive. This is particularly disadvantageous with a view to renovating sports pitches and/or replacing filler materials.

The invention is therefore based on the object of achieving a recycling device which overcomes the problems of the prior art, in particular of proposing a recycling device which enables tape material which has already been uninstalled and filled with one or a plurality of filler materials to be recycled in a simple and cost-effective way.

SUMMARY OF THE INVENTION

Proposed according to the invention is therefore a recycling device for removing filler material from a strip-shaped tape material having an upper side comprising projecting elements and a lower side without projecting elements, in particular from artificial turf, having an unwinding means which is disposed at the entry side and configured for unwinding a roll of the tape material; a transport system for conveying the tape material along a transport path from an entry side to an exit side, which comprises at least one transport means; and an emptying means for the tape material, said emptying means being disposed so as to face the lower side, and the transport path being redirected in said emptying means such that the filler material can drop out of the tape material.

Recycling or preparing can take place in a significantly more rapid and cost-effective manner by means of the proposed recycling device. Because conventional recycling devices had to move below the tape material in order for the latter to be picked up, the processing rate of said conventional recycling devices would also limit the travel speed of the latter. It thus took a certain period of time until conventional recycling devices had travelled across an affected surface in order for the entire tape material to be picked up. The affected surface was blocked during this period of time and could not be otherwise utilized. The recycling procedure per se also required a specific period of time.

The recycling device according to the invention on the entry side thereof has an unwinding means. In order to pick up tape material, a tape material which has been rolled up so as to form a roll can now be deposited in the unwinding means from where said tape material runs along the transport path through the recycling device. The recycling device thus no longer has to travel in a time-consuming manner across the affected surface. The recycling device can be disposed or even set up next to the affected surface, for example, or else be disposed or set up so as to be very remote from said surface. In order for the affected surface to now be able to be utilized again as fast as possible, the material to be recycled has only to be uninstalled, or cut into tape material, and to be rolled up. Said material can thereafter already be transported away and supplied to the recycling device according to the invention.

The unwinding means can have at least one drive, a drive which can be controlled in an open loop or a closed loop. This drive serves for generating an unwinding speed for the unwinding of the tape material from a roll. The tape material here bears on movable unwinding elements, for example rolls, rollers or belts which correspondingly move and cause the roll being unwound to rotate. When unwinding, such a drive achieves that no displacements or a backup of tape material arise during the unwinding procedure as a result of excessively fast unwinding in comparison to the transporting speed by means of the transport means.

Emptying means are to be understood as an assembly of one or a plurality of device parts which act on the tape material, such as, for example, rollers, beating shafts, contact pressure rollers, or other elements which are suitable for engaging in or on the tape material. It is relevant herein that the emptying means is capable of treating the tape material in such a manner that the filler material is removed from the tape material. Brushes or gear wheels, or needle rollers or toothed rollers, which carry out an impingement or an engagement in the tape material so as to move the filler material to drop out of the tape material, to be beaten, combed or brushed out of said tape material, or in any other way removed from the tape material, can also be considered to be emptying means, for example. However, thrashers or brushes, for example rotating thrashers or rotating brushes, may also be provided as emptying means.

It is conceivable for the emptying means to comprise at least one beating shaft for beating the tape material. A correspondingly folded-over tape material, such as artificial turf, is indeed already partially emptied by being bent, because the filler material can drop downward out of said tape material. However, the emptying efficiency can be significantly increased when an additional mechanical treatment of the tape material is performed, such as can be provided by a beating shaft. Depending on the requirements, the latter can have a multi-edge profile in the cross section, so as to periodically expand the downwardly oriented surface of the tape material and to set the latter in vibration. A particularly positive effect of the removal procedure can be achieved herewith.

The emptying means can also be a deflection means or serve as such, about which the tape material is deflected and, on account thereof, bent open on the upper side so as to distance the projecting elements from one another and to implement improved emptying of the filler material. The wrapping angle between the tape material and the deflection means can be, for example, 150° to 190°.

In the context of the present invention, a transport means is to be understood to be a means, or an assembly of elements, which guarantee continuous transportation of the tape material. This herein can be, for example, an assembly of a plurality of rollers or rolls across which the tape material is guided. Likewise to be understood to be a transport means is a transport track, a transport belt, or a belt which is composed of one or a plurality of links and has a longitudinal extent, a conveyer chain or drag chain, or a link conveyor. The transport means here typically comprises at least one drive which guarantees the linear indexing of the elements of the transport means. A continuous belt or the like on which the tape material is guided, or by way of which the tape material is pulled, dragged or transported, can be used or provided by suitable deflection means.

The tape material can be a strip of artificial turf, wherein the projecting elements in this instance are the fibers which project from the artificial turf backing fabric or protrude therefrom. The recycling device can be constructed on a fabricated frame so as to ensure a safe footing. The fabricated frame can be set up directly on a floor, for example soil or the floor of a building.

According to a refinement, the recycling device can be configured without a running gear. Because the recycling device does not have to be moved below the tape material, said recycling device can be configured so as to be stationary, or for a standing construction, dispensing with a dedicated running gear. This has advantages in particular in terms of the stability of the device because the latter can be of a wider and heavier construction.

According to a refinement, the recycling device can be set up on a transport base, in particular a container base. The transport base in this instance is a component part of the recycling device. The recycling device can construct directly on the transport base, or be set up on the transport base by way of a fabricated frame.

The recycling device, for transporting the latter, can comprise a transport base. The latter can be configured as a closed rectangular container base, for example as a floor of an ISO container. The standardized container corners of the latter enable simple stacking and loading. Moreover, the recycling device in this instance can be easily gripped by a crane, or be engaged therebelow by a forklift truck, and loaded. It is moreover conceivable that a transport housing, for example the sidewalls and the roof of an ISO container, can be placed onto the transport base. The fixed disposal of a recycling device in an ISO container is also conceivable, wherein the transport path can run in the longitudinal direction of the ISO container, such that the recycling device can be fed with rolls of tape material through the open doors. The emptied tape material can be retrieved again through doors at the opposite end. The storage in a housing serves as a protection against weather, theft and vandalism.

According to a refinement, the recycling device can comprise a brushing means which is disposed so as to face the lower side downstream of the emptying means in the transport path. On account of the loaded tape material being rolled up, the filler material which is interspersed on the upper side can adhere to the lower side of the next winding bearing on said filler material. The brushing means thus sweeps the lower side or the artificial turf backing. In this way, the filler material which has not already been able to be removed by the emptying means can also be removed from the tape material. This results in an emptied tape material, and fractioning of filler materials of in each case high purity is enabled. The brushing means can comprise one or a plurality of brush rollers which are rotatable about a rotation axis and are driven by a drive. The at least one drive can be controlled in an open loop or a closed loop. The brush roller here possesses bristles which by virtue of the rotating movement slide along the tape material and thus sweep the filler material bearing on the latter, for example. The rotation axis here is oriented so as to be parallel to the plane of the tape material, typically so as to be horizontal. The rotating direction of the brush roller can run in the direction of the transport path or counter to the direction of the transport path. The rotating direction may optionally also be reversible.

According to a refinement, the recycling device at the exit side can comprise a winding-up unit for winding up the tape material so as to form a roll. The winding-up unit serves for winding or rolling up the tape material so as to form a roll. The tape material here bears on movable rolling-up elements, for example on rolls, rollers or belts which correspondingly move and cause the roll being created to rotate. The rolling-up means can have at least one drive, a drive which can be controlled in an open loop or a closed loop. This drive serves for generating a winding-up speed for the rolling up action and facilitates compact winding during the rolling-up procedure. The rolling-up means can have a delivery function by way of which said rolling-up means delivers the full roll from a winding-up location where the roll is created to a delivery location where the roll can be transported away. It is conceivable, for example, that a rolling-up element is adjustable from a winding-up position to a delivery position. For instance, a belt of the rolling-up means here could be hydraulically lowered so that the roll can be conveyed from the winding-up location to the delivery location, for example on a pallet, or is able to roll from the winding-up location to the delivery location in a self-acting manner.

According to a refinement, the recycling device can comprise a cleaning means for removing microparticles upstream of the exit side in the transport path, wherein the cleaning means is configured for applying at least a water jet and/or a water mist, a blowing air flow, a suctioning air flow, and/or an ultrasonic impingement. In order to achieve a high level of purity of the tape material, for example for a subsequent re-installation, and to prevent filler material escaping into the environment, a cleaning means is disposed in the end region of the transport path, downstream of the emptying means in the transport path. Said cleaning means serves in particular for removing microplastics and small particles than those which are predominantly removed by the emptying means. The cleaning means can apply a water jet or a plurality of water jets to the upper side and/or the lower side, in such a manner that the water can flow through the spaces between the projecting elements in a manner perpendicular or angular in relation to the impacted surface, or parallel to the surface. Additionally or alternatively, a water mist can be applied to the upper side and/or the lower side, said water mist binding the smallest particles and removing the latter from the tape material. As a result, microplastic particles which are situated in the air about the tape material can also be bound. Additionally or alternatively, an air flow can suction microplastic particles or blow the latter in a targeted direction, for example into a collection container. Ultrasonic impingement of the tape material in order to loosen and release microplastic particles is also conceivable.

According to a refinement, the recycling device can comprise a suctioning means upstream of the emptying means in the transport path, downstream of the emptying means in the transport path and/or in place of the emptying means. A significant amount of dirt and dust usually accumulates in the tape material over the service life. As a result of the impingement of the tape material by the emptying unit, the dirt and dust can be released from the tape material to the ambient air, this resulting in a dust aerosol. This dust aerosol can be removed by means of the suctioning means, wherein the suctioning means is disposed so as to be physically close to the emptying unit in such a manner that said suctioning means can carry out the suctioning function thereof. The suctioned dust and dirt is thus reliably discharged and can subsequently be cleaned and/or recycled. The suctioning means can be configured like a vacuum cleaner, for example, which suctions the dust created from the tape material upper side and/or the tape material lower side. The suctioning means is configured in such a manner and/or in relation to the emptying means disposed in such a manner that ideally no filler material but only the dust aerosol is suctioned. The suctioning air flow can run counter to the transport path, for example, and/or the suctioning means, in terms of a standing construction, can be disposed above the emptying means. This facilitates the recycling of the suctioned dust and dirt. The suctioning means can also have at least one, interchangeable, filter element. The suctioning device serves for separating particles from the picked-up mixture and for supplying said particles to the filter element. The suctioning means can also comprise a suctioning fan having a drive, a drive which can be controlled in an open loop or a closed loop.

According to a refinement, the recycling device in a vertical region below the emptying means can comprise a conveying means which runs transversely to the transport path. The filler material which by means of the emptying means has been removed by the tape material drops downward, this being caused by gravity. From there, the removed filler material can be reliably transported away by the conveying means which can be configured so as to be disposed transversely to the transport path of the device and/or as a conveyor belt. As a result, an uninterrupted operation of the recycling device is possible which does also not necessarily require an accumulator for the removed filler material. The conveying means here comprises a conveyor belt such that a flexible pick-up of the filler material removed from the tape material is made possible. The conveying means can have at least one drive, a drive which can be controlled in an open loop or a closed loop. Guide elements which configure a duct can be disposed between the emptying means and the conveyor belt. The guide elements can be, for example, baffle plates which, in the manner of a funnel, direct the removed filler material to the conveying means. The conveying means, which may be configured as a conveyor belt, in the cross section can have a planar support face or else a concave support face, wherein the conveyor belt in the latter case can per se configure a part of funnel-type guide elements. This conveying means can lead to a further conveying means which is configured as a collating conveying means and to which a plurality of or all conveying means lead indirectly or directly.

According to a refinement, the recycling device in a vertical region below an intermediate region configured by two neighboring transport means can comprise a conveying means which runs transversely to the transport path. While the transport means primarily serve for transporting the tape material through the recycling device, filler material can already be loosened or released from the tape material in the region of said transport means and drop downward as a result of gravity. There, the respective filler material can be reliably transported away by the conveying means which can be configured so as to be disposed transversely to the transport path of the device and/or as a conveyor belt. As a result, any contamination of the recycling device and the environment is reliably avoided. These conveying means can lead indirectly or directly to the collating conveying means. These conveying means can protrude beyond the width of the transport means so as to, in terms of the transport path, also laterally pick up filler material dropping down. The conveying means here comprises a conveyor belt such that a flexible pick-up of the filler material removed from the tape material is made possible. Each conveying means can have at least one drive, a drive which can be controlled in an open loop or a closed loop. Guide elements which configure a duct can be disposed between the intermediate region of two transport means and the conveyor belt.

The guide elements can be, for example, baffle plates which, in the manner of a funnel, direct the respective filler material to the conveying means. The conveying means, which may be configured as a conveyor belt, in the cross section can have a planar support face or else a concave support face, wherein the conveyor belt in the latter case can per se configure a part of funnel-type guide elements.

According to a refinement, the recycling device can comprise at least one conveying means for transporting away the filler material removed from the tape material. The conveying means can be a conveyor belt. The conveying means can be a collating conveying means which is disposed so as to be parallel to the transport path and lateral to the transport means, or runs below the transport means. The collating conveying means can lead to a collection container or a fractioning means. The conveying means here can comprise a conveyor belt which is pivotable by 180 degrees such that a flexible pick-up of the filler material removed from the tape material is made possible. Each conveying means can have at least one drive, a drive which can be controlled in an open loop or a closed loop.

According to a refinement, the recycling device can be designed in such a manner that a conveying means transports the filler material to a fractioning means for fractioning the filler material removed from the tape material. This conveying means can be the collating conveying means. The fractioning means serves for separating the infed filler material from the tape material into the different component parts thereof. The filler material can be composed of different component parts. The filler material is often composed of two different types of particles, for example sand and granules, each having a different grain size. These component parts can advantageously be sorted with a view to a comprehensive recycling process and any potential subsequent use. The fractioning can take place by means of screening and/or air pressure, for example. The fractioning means can be integrated in a frame of the recycling device or be disposed on the transport base. However, said fractioning means may also be able to be disposed separately.

According to the invention, the recycling device can comprise one or a plurality of the following sensors:
- a quantity sensor, disposed at the entry side, for detecting the quantity of filler material in the tape material;
- a filler material type sensor, disposed at the entry side, for detecting the type of the filler material in the tape material;
- a length sensor, disposed at the entry side, for detecting the length of the tape material;

a tape material type sensor, disposed at the entry side, for detecting the type of the tape material and/or of the projecting elements;

a density sensor, disposed at the entry side, for detecting a density of projecting elements;

a pressure sensor, disposed on the emptying means, for detecting a tension of the tape material;

a temperature sensor, disposed at the entry side, for detecting a temperature of the tape material;

a flow sensor for detecting the quantity of filler material removed from the tape material;

at least one quality sensor in the fractioning means for determining the quality, for example the purity, of the fractioned filler material.

Individual sensors may also be present in multiples.

The recycling device for controlling thereof in an open loop and/or a closed loop can thus have various sensors. The recycling device can moreover have a controller to which each of the sensors is connected for transmitting data. The controller can moreover be connected for transmitting data to the drives. These connections can be wireless and/or wired. Based on the data of the sensors, the controller can control the drives individually or in groups in an open loop or a closed loop such that previously determined process parameters are adhered to. This open-loop or closed-loop control can take place automatically or else manually. Manual control interventions into automatic controlling are also conceivable. The controller is configured for visually outputting, for example on a screen, having an input unit, current and historic sensor data, drive parameters and process parameters.

For example, the parameters "transport speed and/or transport direction of the transport means", "rotating speed of the deflection roller and/or of the beating roller supported by the deflection roller", "unwinding speed", "winding speed", "rotating speed of the brushing means", "waterjet pressure of the cleaning means", "water quantity of the cleaning means", "air pressure of the cleaning means", "frequency and/or amplitude and/or interval management of the ultrasonic cleaning of the cleaning means", "suction force of the suction means", "conveying speed and/or conveying direction of one or a plurality of conveying means", "fractioning rate of the fractioning means", "rotating speed and/or torque of a contact pressure roller" can be set by means of the sensor data, for example by correspondingly controlling drives.

The interdependences of individual parameters for a reliable and/or efficient operation have to be taken into account. For example, changing the transport speed leads to at least the unwinding and/or winding-up speeds having to be adapted in order to prevent any backup or tearing of the tape material. The same can apply to the at least one contact pressure roller. The readjustments of parameters hereunder are only exemplary and not exhaustive. In principle, the parameters can be readjusted with a view to the target value. Target values can be, for example, throughput, efficiency, purity of the tape material.

For example, the transport speed (decreasing the transport speed of the tape material in comparison to a predetermined standard transport speed at a large quantity so that the filler material has sufficient time for exiting the tape material, or increasing the transport speed of the tape material in comparison to a predetermined standard transport speed at a small quantity so as to increase the throughput) can be set or readjusted by means of data of the at least one quantity sensor.

For example, the rotating speed of a deflection roller and/or of a beating roller supported by the deflection roller (decreasing the rotating speed in comparison to a predetermined standard rotating speed at a small quantity so as to be gentle on the tape material, or increasing the rotating speed in comparison to a predetermined standard rotating speed at a large quantity so as to introduce sufficient shocks into the tape material) can be set or readjusted by means of data of the at least one quantity sensor.

Likewise, the parameters can be adapted to the type of the filler material by means of data of the at least one filler material type sensor, because different filler materials can be removed at different efficiencies. For example, the transport speed can be reduced and/or the rotating speed of the deflection roller and/or of the beating roller supported by the deflection roller can be increased in the case of rubber granules which have a high level of friction and therefore have positively adhered in the tape material.

Likewise, the parameters can be adapted to the length of the tape material by means of data of the at least one length sensor. It can be ascertained on account thereof, for example, whether the entire tape material at the end thereof can be wound up so as to form a roll and be accommodated on the latter. It can also be estimated how much filler material is situated in the tape material so as to ascertain in a timely manner the available capacities of filler material containers or of the fractioning means to which the removed filler material can be supplied.

Likewise, the parameters can be adapted to the type of the tape material and/or of the projecting elements by means of data of the at least one tape material type sensor. For example, the transport speed can thus be decreased should the tape material be known for durably retaining filler material. The longer dwell time in the recycling device allows more time for emptying the tape material.

Likewise, the parameters can be adapted to the density of projecting elements by means of data of the at least one density sensor. The denser the projecting elements are disposed, the more reliably said projecting elements retain the filler material. This aspect can be responded to by decreasing the transport speed, for example. In an analogous manner, the transport speed can be increased, for example, so as to increase the throughput should the density not permit a reliable retention of filler material. This also applies, for example, to the rotating speed of the deflection roller and/or of the beating roller supported by the deflection roller, so as to discharge the filler material in the best possible manner.

Likewise, the parameters can be adapted to the tension of the tape material by means of data of the at least one pressure sensor. By means of data of the at least one pressure sensor it is also conceivable for the tension of the tape material to be adjusted to a predefined standard tension or in a predefined standard tension range by correspondingly controlling in an open loop or closed loop respective drives (for example the drives of the transport means, of the contact pressure roller). An excessively low tension leads to a low efficiency of the emptying means because the mechanical effect of the latter is lost in the insufficiently tensioned tape material. An excessively high tension leads to high stress on the material, in particular of the emptying means or else the tape material.

Likewise, the parameters can be adapted to the temperature of the tape material by means of data of the at least one temperature sensor. A cold tape material is typically stiffer than a warm tape material, as a result of which the filler material is more difficult to remove. The transport speed can therefore be decreased so as to increase the dwell time, but the rotating speed of the deflection roller and/or of the beating roller supported by the deflection roller can be increased so as to therebetween heat the tape material by the friction created and/or the impacts. This facilitates the tape material being bent open, by the deflection roller, as well as winding-up the end of the tape material.

Likewise, the parameters can be adapted to the quantity of the filler material removed from the tape material by means of data of the at least one flow sensor. For example, if the quantity of removed filler material which is supplied to the fractioning means exceeds the capacity and/or the efficiency threshold of the fractioning means, the transport speed can be reduced in order to limit the supply of filler material, for example. Alternatively or additionally conceivable is the reduction of the conveying speed of the conveying means, for example of the collating conveying means and/or of the other conveying means conveying to the collating conveying means.

Likewise, the parameters can be adapted to the quality, for example the purity, of the fractioned filler material by means of data of the at least one quality sensor. For example, the operation of the fractioning means can thus be maximized or designed so as to be efficient.

It is also conceivable for only one parameter to be automatically adapted by the controller by virtue of sensor data. A plurality of parameters or application-specific or target value-specific groups of parameters may also be automatically adapted by the controller by virtue of sensor data. Target values can be, for example, throughput, efficiency, purity of the tape material. The control of drives and the sensor-supported detection of parameters is not restricted to the application in this recycling device but is also conceivable in further contexts, for example, such as in a mobile recycling device.

According to a refinement, the recycling device can comprise a controller to which the available sensors can be connected. A controller serves for a particularly high degree of automation in combination with a high processing quality of the tape material, this being able to be achieved when the recycling device is equipped with a sensor-based automatic controller.

According to a refinement, the recycling device can provide a transport means drive for the transport means, an emptying means drive for the emptying means, a conveying means drive for the conveying means, and a beating unit drive for the beating unit, wherein the controller can be operatively connected to at least one of the aforementioned drives. The controller can thus effect and control in an open loop or a closed loop the operation of the at least one drive. Each element can thus be adapted to sensor data, and the recycling device as a whole can be considered to be an unified entity.

Proposed according to the invention is also a method for operating a recycling device, in particular a recycling device according to the disclosure, comprising at least the following steps:
  unwinding a tape material from a roll, wherein the tape material has an upper side comprising projecting elements, and a lower side without projecting elements, in particular from artificial turf;
  conveying the tape material by means of a transport system along a transport path from an entry side to an exit side; and
  emptying filler material from the tape material by means of an emptying means which is disposed so as to face the lower side and is disposed in a region in which the transport path is redirected such that the filler material can be emptied from the tape material.

The method according to the invention serves for recycling in a simple and cost-effective way tape material which has already been uninstalled and is filled with one or a plurality of filler materials, but also for operating a recycling device according to the disclosure. The advantages resulting from the method have already been mentioned above in the context of the recycling device, reference herewith being made thereto in order to avoid repetitions.

According to a refinement, the method can comprise brushing the underside of the tape material by means of a brushing means. The advantages resulting from the method have already been mentioned above in the context of the brushing means of the recycling device, reference herewith being made thereto.

According to a refinement, the method can comprise suctioning by means of a suctioning means an aerosol caused by the emptying means, in particular a dust aerosol. The advantages resulting from the method have already been mentioned above in the context of the suctioning means of the recycling device, reference herewith being made thereto.

According to a refinement, the method can comprise:
  decreasing the transport speed of the tape material in comparison to a predetermined standard transport speed should the temperature of the tape material detected by means of a temperature sensor undershoot a predetermined limit value; or
  increasing the transport speed of the tape material in comparison to a predetermined standard transport speed should the temperature of the tape material detected by means of a temperature sensor exceed a predetermined limit value.

The advantages resulting from the method have already been mentioned above in the context of the temperature-controlled transport speed, reference herewith being made thereto.

According to a refinement, the method can comprise:
  decreasing the rotating speed of a beating unit and/or of a beating shaft of the emptying means supported by the beating unit in comparison to a predetermined standard rotating speed should the temperature of the tape material detected by means of a temperature sensor undershoot a predetermined limit value; or
  increasing the rotating speed of a beating unit and/or of a beating shaft of the emptying means supported by the beating unit in comparison to a predetermined standard rotating speed should the temperature of the tape material detected by means of a temperature sensor exceed a predetermined limit value.

The advantages resulting from the method have already been mentioned above in the context of the temperature-controlled rotating speed, reference herewith being made thereto.

According to a refinement, the method can comprise one or a plurality of the following steps:
  detecting the quantity of filler material in the tape material by means of a quantity sensor, disposed at the entry side;
  detecting the type of the filler material in the tape material by means of a filler material type sensor, disposed at the entry side;
  detecting the length of the tape material by means of a length sensor, disposed at the entry side;
  detecting the type of the tape material and/or of the projecting elements by means of a tape material type sensor, disposed at the entry side;

detecting a density of projecting elements by means of a density sensor, disposed at the entry side;

detecting a tension of the tape material by means of a pressure sensor, disposed on the emptying means;

detecting a temperature of the tape material by means of a temperature sensor, disposed at the entry side; and/or detecting the quantity of filler material removed from the tape material by means of a flow sensor.

The advantages and correlations resulting from the method have already been mentioned above in the context of the acquisition of data by the mentioned sensors, reference herewith being made thereto.

According to a refinement, the method can provide that at least one drive of the group of drives comprising transport means drive, emptying means drive, conveying means drive, beating unit drive and beating shaft drive, is controlled as a function of at least one parameter detected by an aforementioned sensor. The advantages and correlations resulting from the method have already been mentioned in the context of the sensor-based controlling of drives, reference herewith being made thereto.

BRIEF DESCRIPTION OF THE DRAWINGS

Further features, details and advantages of the invention are derived from the wording of the claims as well as from the description hereunder of exemplary embodiments with the aid of drawings in which:

FIG. 2b shows a longitudinal sectional view through the device according to FIG. 2a.

DETAILED DESCRIPTION

Identical or mutually equivalent elements are in each case identified with the same reference sign in the figures and are therefore not described yet again, unless this is expedient. To avoid repetition, features already described are not described again and can be applied to all elements with the same or mutually corresponding reference signs, unless explicitly excluded. The disclosures contained in the entire description can be applied in analogous manner to identical parts having the same reference signs, or the same component reference signs, respectively. Also, the positional indications chosen in the description such as, for example, top, bottom, lateral, etc., relate to the figure directly described and illustrated, and in the case of a positional modification are to be transferred in analogous manner to the new position.

Furthermore, individual features or combinations of features of the different exemplary embodiments shown and described can also per se represent independent inventive solutions, or solutions according to the invention.

Figure 1:
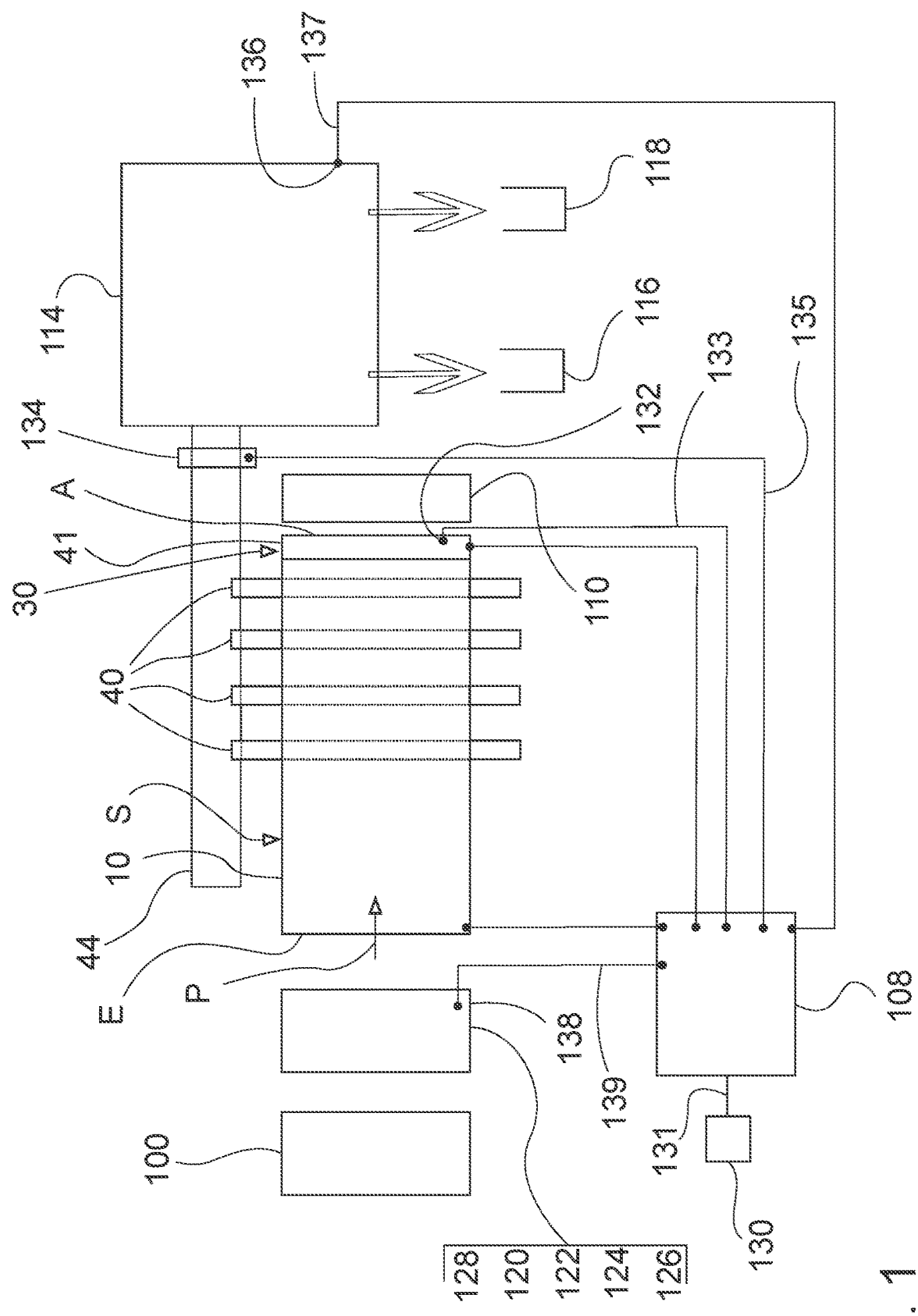
FIG. 1 shows a schematic view of an elevation of a device according to the invention.

FIG. 1 shows a schematic fundamental construction of the recycling device for separating filler material from a strip-shaped tape material B, the latter in this example intended to be artificial turf which has previously been installed in a planar manner. The tape material B has an upper side O comprising projecting elements, and a lower side U without projecting elements. In the case shown, the projecting elements are the fibers of the artificial turf.

The recycling device has an entry side E at which an unwinding means 100, which serves for receiving and unwinding a roll R of the tape material B which is loaded with filler material, is disposed. Strips of this tape material B are supplied by way of a transport means 10 of a transport system S along a transport path P, via a beating unit 41 which also serves as a deflection means, and finally in an undulated manner through an emptying means 30, wherein filler material incorporated in the artificial turf is removed and drops on to one of the conveying means 40. The conveying means 40 configured as transport belts supplies a conveying means 44 which runs orthogonal to said conveying means 40 and which is configured as a collating conveying means and in turn supplies a fractioning means 114. The fractioning means 114 fractions the supplied filler material into the component parts thereof and sorts the latter in collection containers 116, 118. The recycling device at the end of the transport path P has an exit side A. A winding-up unit 110 which serves for receiving and for winding-up a roll R of the tape material B, emptied of filler material, is disposed at the exit side A.

The recycling device comprises a controller 108 which comprises the processor. The controller 108 is connected for transmitting data to sensors hereunder and is operatively connected to drives hereunder of the recycling device. Shown in terms of sensors are:

a quantity sensor 120 at the entry side E, for detecting the quantity of filler material in the tape material B;

a filler material type sensor 122 at the entry side E, for detecting the type of filler material in the tape material B;

a length sensor 124 at the entry side E, for detecting the length of the tape material B;

a tape material type sensor 126 at the entry side E, for detecting the type of tape material B and/or the type of projecting elements;

a density sensor 128 at the entry side E, for detecting a density of projecting elements;

a temperature sensor 130 at the entry side E, for detecting a temperature of the tape material B, having a data line 131;

a pressure sensor 132 on the emptying means 30, for detecting tension of the tape material B, having a data line 133;

a flow sensor 134 for detecting the quantity of filler material removed from the tape material B, having a data line 135; and/or a quality sensor 136 in the fractioning means 114, for determining the quality, for example the purity, of the fractioned filler material, having a data line 137.

The sensors 120, 122, 124, 126 and 128 are combined so as to form a sensor unit 138 having a single illustrated data line 139. In terms of drives which are operatively connected to the controller 108 there are:

one separate transport means drive for each transport means 10;

one emptying means drive for the emptying means 31;

one conveying means drive for each conveying means 40, 44; and one beating unit drive for the beating unit 41.

Based on the sensor data, the controller 108 can control in an open loop or a closed loop one, a plurality, or all of the drives.

Figure 2A:
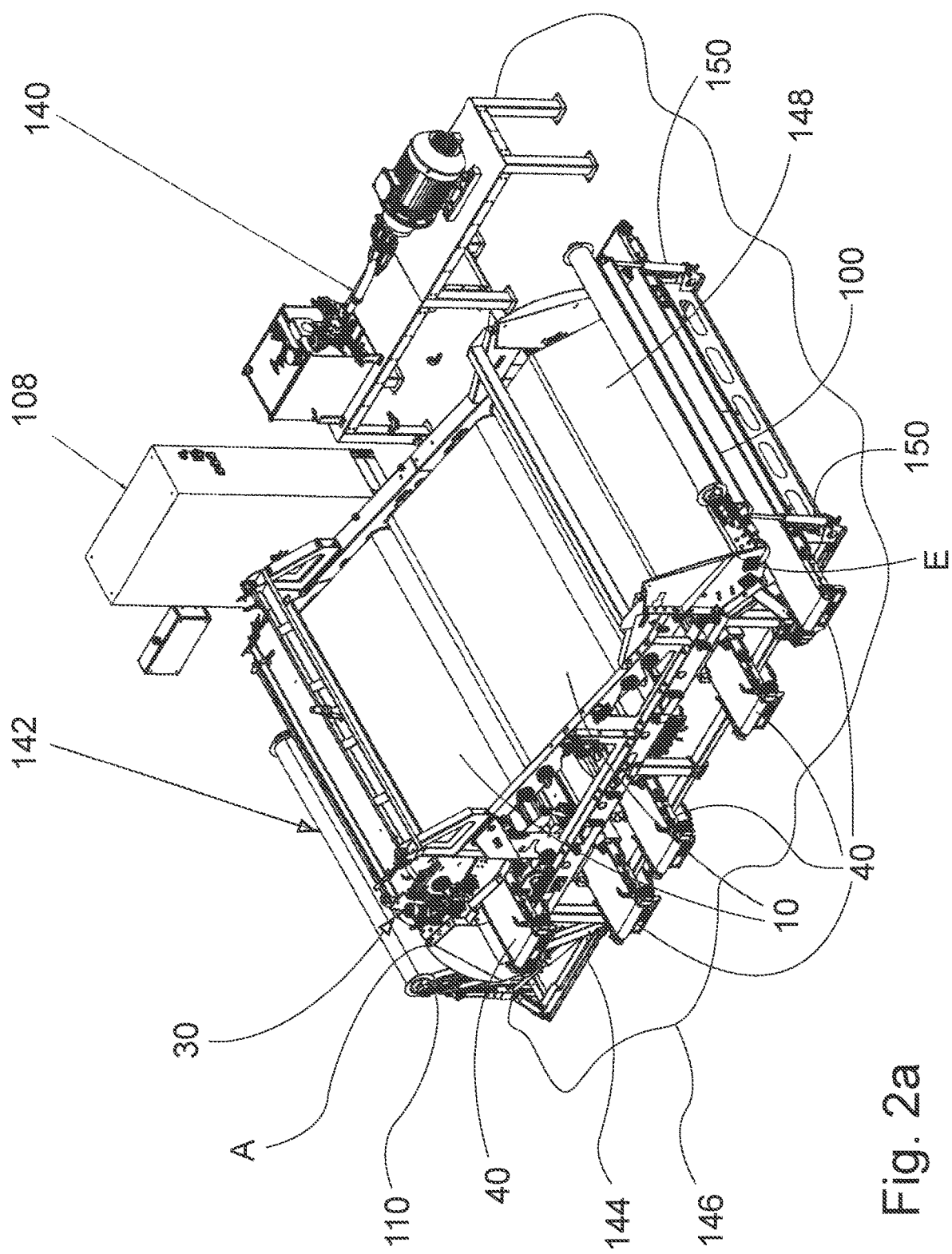
FIG. 2a shows a perspective view of a device according to the invention.
Figure 2B:
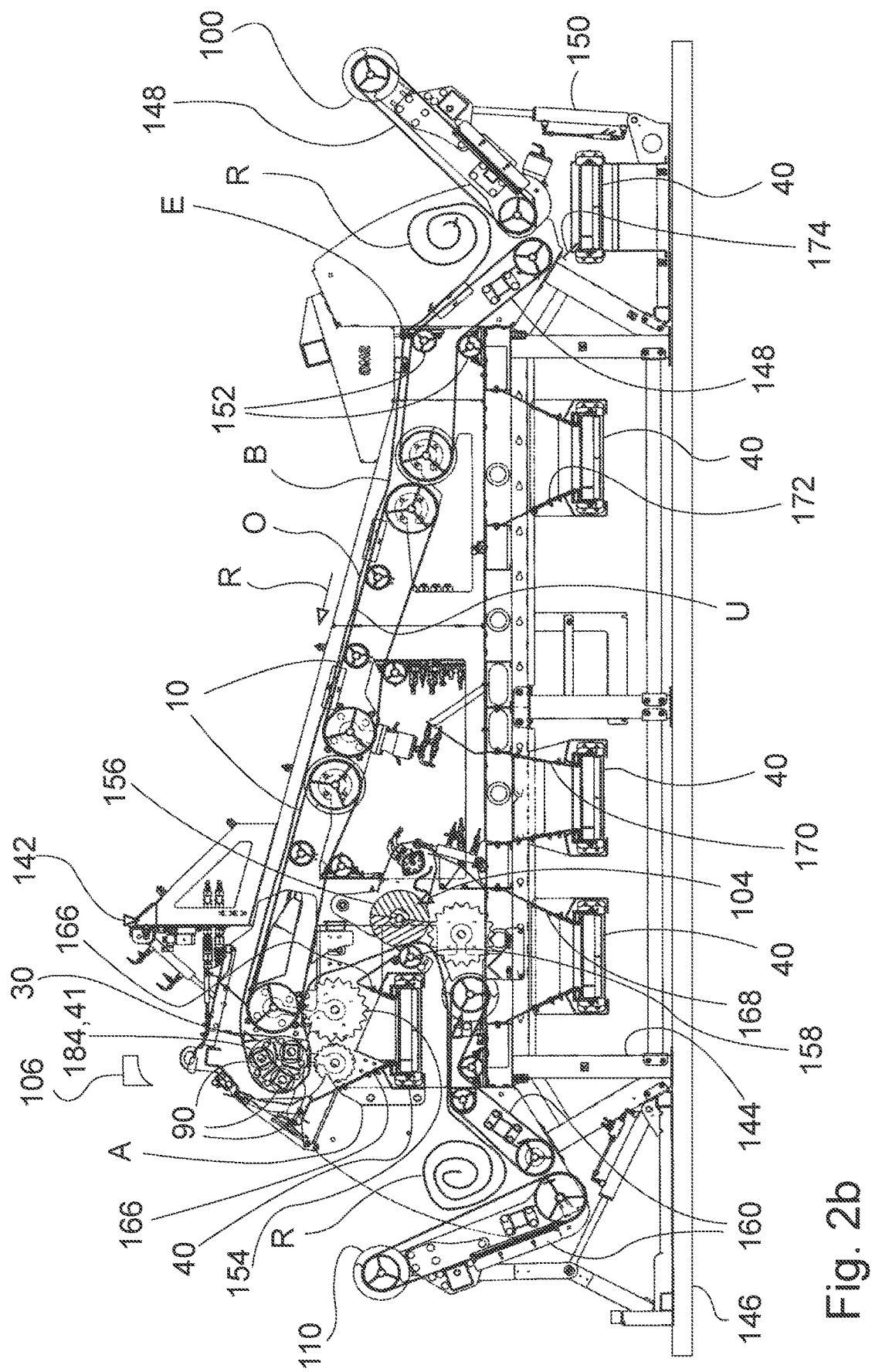

FIGS. 2a and 2b show views of a potential embodiment of the recycling device according to the invention, however without fractioning means 114 and without conveying means 44 supplying the latter. The recycling device, additionally to the controller 108, comprises a hydraulics unit 140 which is operatively connected to the controller 108 and serves the hydraulic components of the recycling device.

The base unit 142 of the recycling device is additionally depicted. It can be seen that the recycling device does not have a running gear but is designed without a running gear and possesses a fabricated frame 144 which is constructed on a transport base 146 and fastened to the latter. Only a portion of the transport base 146 is schematically illustrated. The recycling device is thus depicted as a standing construction.

The unwinding means 100 comprises two transport belts 148 which are tilted toward one another and configure a V-shaped receptacle space for the roll R. The transport belt 148 which is to the right in the image plane can be inclined in relation to the other transport belt 148 by means of hydraulic cylinder 150 so that a flatter or deeper receptacle space can be formed.

Moving the transport belts 148 leads to the tape material B being unwound from the roll R. The left one of the two transport belts 148 is angled across rolls 152 and in the manner of a ramp guides the tape material B upward to a transport means 10 which is configured as a conveyor belt and in turn adjoins a further transport means 10 which is configured as a conveyor belt.

After the latter transport means 10 in the transport path direction, the tape material is guided over the emptying means 30 which carries out a plurality of tasks. Firstly, there is a wrapping angle of approximately 180° between the tape material B and the beating shaft 90 of the emptying means 30. As a result, the beating unit 41 serves for deflecting the tape material B and bending open the upper side of the latter, using only a single component. The emptying means 34 for the tape material B is disposed so as to face the lower side U, specifically in a region in which the transport path P is redirected such that the filler material can drop out of the tape material B. The emptying means 30 comprises the beating unit 41, having three beating shafts 90 which are able to move radially in terms of the rotation axis of the beating unit 41. Said beating shafts 90 can be guided in slotted pieces of the end sides of the beating unit 41. By virtue of the centrifugal force in the rotation of the beating unit 41, the beating shafts 90 are thrown radially outward and thus exert an impacting beating movement on the tape material B. The beating shafts 90 are configured as square tubes and are mounted so as to be separately rotatable, but they can also be rotationally fixed. The beating shafts 90 do not have any dedicated drive.

The beating unit 41 can be part of the transport system S and serve as a deflection means. The beating unit 41 comprises a deflection roller 184 having a support frame which is able to be rotatingly driven by the beating unit drive and on which in turn a plurality of, in this example three, beating rollers 90 which again are able to be rotatingly driven are mounted. The beating rollers 90 here have a substantially square cross section which imparts a particularly intensive beating action. The tape material B is thus not only conveyed and deflected by the deflection roller 184 but simultaneously also particularly efficiently emptied. The filler material dropping out at the emptying means 30 here falls downward through a duct 186 onto the conveying means 40 and can thus be laterally transported away.

A suction means 106 for suctioning dust aerosol is disposed in the region of the beating unit 41, or above the latter. Said dust aerosol can be created on account of the mechanical impingement of the tape material B by the beating unit 41. The tape material B is thus guided over the beating unit 41 and subsequently across two contact pressure rollers 154, 156, each having a separate drive. The contact pressure roller 154 is part of the transport system S and serves for transporting the tape material B.

A gap for guiding the tape material B, in particular for conveying the latter in a friction-fitting manner, is provided between the contact pressure roller 154 and the transport means 10. Friction-fitting conveying here is to be understood as conveying in which transport means 10 and the contact pressure roller 154 bear on both sides of the tape material B and are capable of achieving a linear forward movement of the tape material B solely by virtue of the friction between the tape material B and the transport means 10 and the contact pressure roller 154. The tape material B here bears on the transport system S, or an element of the transport system, for example the transport means 10 and the contact pressure roller 154, or is supported thereon. Apart from guiding the tape material B, the movement of the latter in the device is also ensured such that continuous conveying of the tape material B through the device and almost complete emptying of the tape material B, or of the excess filler material or intersperse material present there, such as sand, for example, and/or all other materials provided and suitable for filling artificial turf pitches, can take place.

A brushing means 104 which comprises a brush roller 156 driven by a drive is disposed further downstream in the transport path. The bristles of the brush roller 156 sweep the lower side U, wherein a contact pressure roller 158 on the opposite side of the tape material B forms a counter-bearing and keeps the tape material taught in the brush region.

At the exit side, the recycling device has the winding-up means 110. The winding-up means 110 comprises two transport belts 160 which are tilted toward one another and configure a V-shaped receptacle space—a winding-up location—for the roll R. The transport belt 160 which is to the left in the image plane can be tilted in relation to the other transport belt 160 by means of hydraulic cylinder 162 such that a flatter or deeper receptacle space can be formed. As a result, the adjustable transport belt 160 can in part also be adjusted so as to be below the other transport belt 160 such that an incline is created and the roll R can roll out of the receptacle space. Moving the transport belts 160 leads to the tape material B being rolled up so as to form the roll R. The right one of the two transport belts 160 is angled across rolls 164 and leads the tape material B away from the brushing means 104.

The recycling device comprises five conveying means 40, wherein one conveying means 40 is disposed in a vertical region below the emptying means 30 and runs transversely to the transport path P. Funnel-type guide elements 166 lead to the conveying means 40. To be seen are moreover intermediate spaces between the two transport belts 148, between one transport belt 148 and the neighboring transport belt as the transport means 10, and between the two transport belts of the transport means 10. One conveying means 40 is disposed in the vertical region below each of these intermediate spaces. Moreover, one conveying means 40 is disposed below the brushing means 104. All these conveying means 40 run transversely to the transport path P, wherein guide elements 168, 170, 172, 174 lead to the respective conveying means 40.

Figure 3:
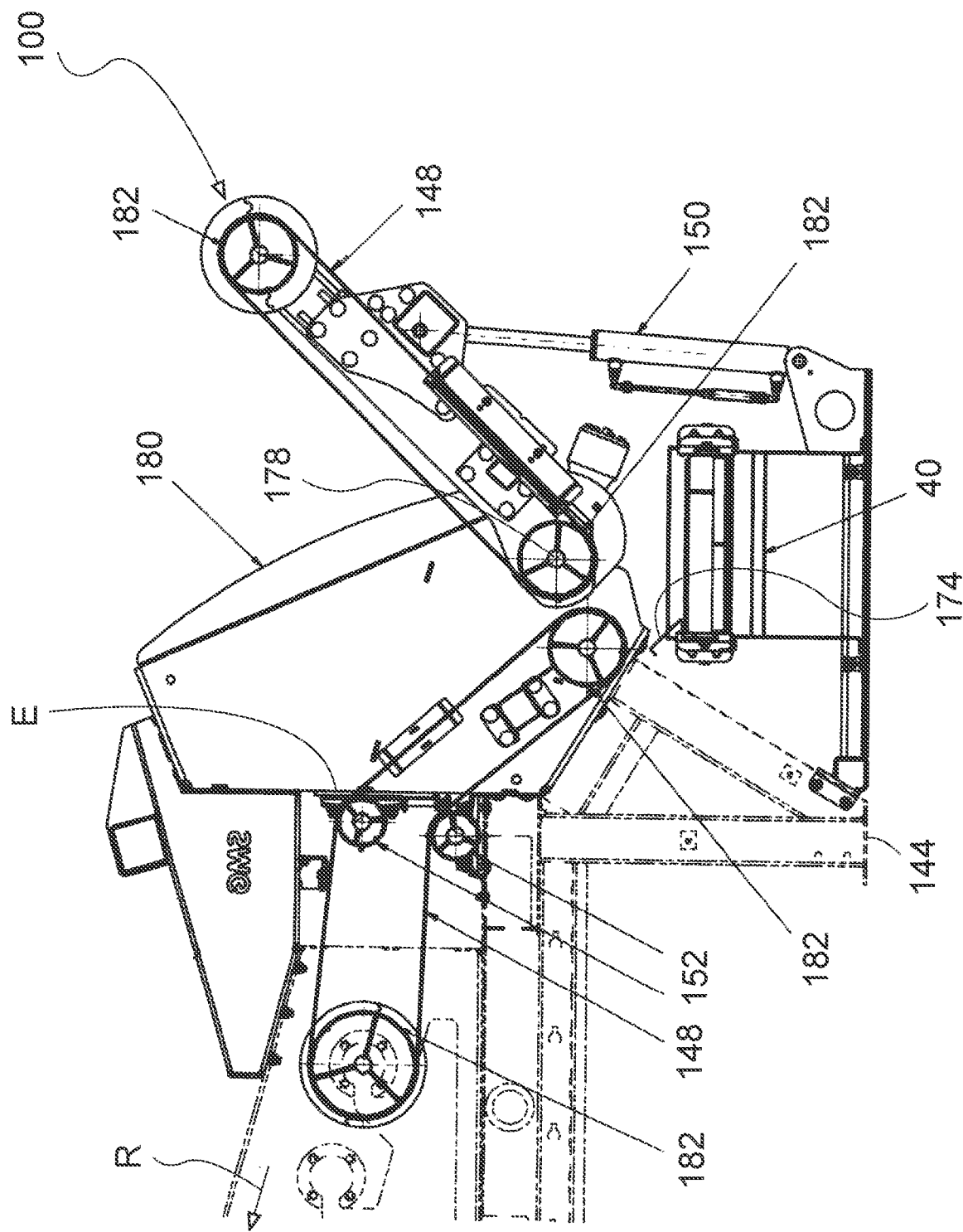
FIG. 3 shows an unrolling means.

FIG. 3 shows the unwinding means 100 from FIG. 2b in a detailed view. The unwinding means 100 comprises an unwinding table 176 having the right one of the two transport belts 148. The left one of the two transport belts 148 can be considered to be as it were an element of the unwinding means 100 as well as an element of the transport system S. The transport belts 148 are guided over shafts 182 which are able to be driven. The hydraulic cylinder 150 for the unwinding table 176 at one end is articulated on the fabricated frame 144 and at the other end on the unwinding table 176. The unwinding means 100 can alternatively also have a separate frame which is connected to the fabricated frame 144. The unwinding table 176 is articulated on a support 180 so as to be rotatable about a rotation axis 178.

The invention is not limited to any of the embodiments described above but can be modified in many ways. All features and advantages, including constructive details, spatial arrangements, and method steps, which result from the claims, the description and the drawing, can be relevant to the invention individually as well as in the most varied combinations.

All combinations of at least two features which are disclosed in the description, the claims and/or the figures are within the scope of the invention.

For the avoidance of repetitions, features that are disclosed in relation to the device are also to be understood as having been disclosed and able to be claimed in relation to the method. Likewise, features that are disclosed in relation to the method are to be understood as having been disclosed and able to be claimed in relation to the device.

LIST OF REFERENCE SIGNS

10 Transport means
30 Emptying means
40 Conveying means
41 Beating unit
44 Conveying means
90 Beating shaft
100 Unwinding means
102 Transport base
104 Brushing means
106 Suctioning means
108 Controller
110 Winding unit
114 Fractioning means
116 Collection container
118 Collection container
120 Quantity sensor
122 Filler material type sensor
124 Length sensor
126 Tape material type sensor
128 Density sensor
130 Temperature sensor
131 Data line
132 Pressure sensor
133 Data line
134 Flow sensor
135 Data line
136 Quality sensor
137 Data line
138 Sensor unit
139 Data line
140 Hydraulics unit
142 Base unit
144 Fabricated frame
146 Transport base
148 Transport belt
150 Hydraulic cylinder
152 Roll
154 Contact pressure roller
156 Brush roller
158 Contact pressure roller
160 Transport belt
162 Hydraulic cylinder
164 Roll
166 Guide element
168 Guide element
170 Guide element
172 Guide element
174 Guide element
176 Unwinding table
178 Rotation axis
180 Support
182 Shaft
184 Deflection roller
186 Duct
A Exit side
B Tape material
E Entry side
P Conveying path
O Upper side
R Roll
S Transport system
U Lower side

The invention claimed is:

1. A recycling device for removing filler material from a strip-shaped tape material, said tape material comprising an upper side having projecting elements, and a lower side that is free of projecting elements, the recycling device comprising:
an unwinding means, which is disposed at an entry side and configured for unwinding a roll of the tape material;
a transport system for conveying the tape material along a transport path from the entry side to an exit side, which comprises at least one transport means;
an emptying means for the tape material, said emptying means being disposed so as to face the lower side, and the transport path in said emptying means being redirected such that the filler material can drop out of the tape material; and
said recycling device further comprises a plurality of conveying means that runs transversely to the transport path and is disposed in a vertical region below the emptying means, a third conveying means and a fourth conveying means that each run transversely to the transport path and are disposed in a vertical region below an intermediate region configured by two neighboring transport means, a fifth conveying means that transports the filler material to a fractioning means for fractioning the filler material removed from the tape material, the at least one transport means being constructed and arranged to define the emptying means along the transport path, and wherein the recycling device is set up on a transport base.

2. Recycling device according to claim 1, characterized in that said recycling device is configured without a running gear.

3. Recycling device according to claim 1, characterized in that a brushing means is disposed so as to face the lower side downstream of the emptying means in the transport path.

4. Recycling device according to claim 1, characterized in that a winding-up unit for winding up the tape material so as to form a roll is disposed at the exit side.

5. Recycling device according to claim 1, characterized in that a cleaning means for removing microparticles is disposed upstream of the exit side in the transport path, wherein the cleaning means is configured for applying at least a water jet and/or a water mist, a blowing air flow, a suctioning air flow, and/or an ultrasonic impingement.

6. Recycling device according to claim 1, further comprising, a suctioning means is disposed upstream of the emptying means in the transport path and/or downstream of the emptying means in the transport path.

7. Recycling device according to claim 1, characterized in that said recycling device comprises one or more of the following sensors:
- a quantity sensor, disposed at the entry side, for detecting a quantity of filler material in the tape material;
- a filler material type sensor, disposed at the entry side, for detecting a type of filler material in the tape material;
- a length sensor, disposed at the entry side, for detecting a length of the tape material;
- a tape material type sensor, disposed at the entry side, for detecting a type of the tape material and/or a type of the projecting elements;
- a density sensor, disposed at the entry side, for detecting a density of projecting elements;
- a pressure sensor, disposed on the emptying means, for detecting a tension of the tape material;
- a temperature sensor, disposed at the entry side, for detecting a temperature of the tape material;
- a flow sensor for detecting a quantity of filler material removed from the tape material; and
- at least one quality sensor in a fractioning means, for determining a quality of a fractioned filler material.

8. Recycling device according to claim 1, further comprising, a controller to which available sensors are connected.

9. Recycling device according claim 1, further comprising, a transport means drive is provided for the transport means, an emptying means drive is provided for the emptying means, a conveying means drive is provided for a conveying means, and a beating unit drive is provided for a beating unit, and a controller is operatively connected to at least one of the transport means drive, the emptying means drive, the conveying means drive, and the beating unit drive.

10. Recycling device according to claim 1, wherein the projecting elements comprises artificial turf.

11. Recycling device according to claim 1, wherein the transport base comprises a container base.

12. A method for operating the recycling device of claim 1, comprising at least the following steps:
- unwinding a tape material from a roll, wherein the tape material has an upper side and a lower side;
- conveying the tape material by means of a transport system along a transport path from an entry side to an exit side; and
- emptying filler material from the tape material by means of an emptying means which is disposed so as to face the lower side and is disposed in a region in which the transport path is redirected such that the filler material can be emptied from the tape material.

13. Method according to claim 12, further comprising, suctioning an aerosol caused by the emptying means.

* * * * *